United States Patent
Cappellari et al.

(10) Patent No.: US 10,865,145 B2
(45) Date of Patent: Dec. 15, 2020

(54) DRY CONSTRUCTION COMPOSITION WHICH CAN BE WET-SPRAYED BY MEANS OF SCREW PUMP AND COMPRISING A BINDER AND A BIO-BASED FILLER-PREPARATION AND USES OF SUCH A COMPOSITION

(71) Applicant: PAREXGROUP SA, Issy les Moulineaux (FR)

(72) Inventors: Marco Cappellari, Saint Quentin Fallavier (FR); Lisa Desroses, Saint Quentin Fallavier (FR); Anne Daubresse, Saint Quentin Fallavier (FR)

(73) Assignee: PAREXGROUP SA, Issy les Moulineaux (FR)

( * ) Notice: Subject to any disclaimer, the term of this patent is extended or adjusted under 35 U.S.C. 154(b) by 0 days.

(21) Appl. No.: 16/346,951

(22) PCT Filed: Nov. 2, 2017

(86) PCT No.: PCT/FR2017/053006
§ 371 (c)(1),
(2) Date: May 2, 2019

(87) PCT Pub. No.: WO2018/083420
PCT Pub. Date: May 11, 2018

(65) Prior Publication Data
US 2020/0055777 A1    Feb. 20, 2020

(30) Foreign Application Priority Data

Nov. 3, 2016  (FR) ..................................... 16 60651

(51) Int. Cl.
| | | |
|---|---|---|
| *C04B 28/06* | (2006.01) | |
| *C04B 14/06* | (2006.01) | |
| *C04B 14/24* | (2006.01) | |
| *C04B 18/14* | (2006.01) | |
| *C04B 18/24* | (2006.01) | |
| *C04B 24/16* | (2006.01) | |
| *C04B 24/38* | (2006.01) | |
| *C04B 40/00* | (2006.01) | |
| *B28B 1/32* | (2006.01) | |
| *C04B 103/40* | (2006.01) | |
| *C04B 103/46* | (2006.01) | |
| *C04B 111/00* | (2006.01) | |

(52) U.S. Cl.
CPC ............ *C04B 28/065* (2013.01); *C04B 14/06* (2013.01); *C04B 14/24* (2013.01); *C04B 18/146* (2013.01); *C04B 18/248* (2013.01); *C04B 24/16* (2013.01); *C04B 24/386* (2013.01); *C04B 40/0042* (2013.01); *B28B 1/32* (2013.01); *C04B 2103/402* (2013.01); *C04B 2103/46* (2013.01); *C04B 2111/00163* (2013.01); *C04B 2111/00698* (2013.01); *C04B 2201/30* (2013.01)

(58) Field of Classification Search
CPC ....... C04B 14/06; C04B 14/24; C04B 18/146; C04B 18/248; C04B 24/16; C04B 24/386; C04B 28/065; C04B 40/0042; C04B 2103/402; C04B 2103/46; C04B 2111/00163; C04B 2111/00698; C04B 2201/30; B28B 1/32
See application file for complete search history.

(56) References Cited

U.S. PATENT DOCUMENTS

| | | | |
|---|---|---|---|
| 2,083,961 A | | 6/1937 | New |
| 3,892,586 A | * | 7/1975 | Vladar .................. C08J 9/0004 106/164.42 |
| 2019/0256421 A1 | * | 8/2019 | Daubresse ............. C04B 28/02 |

FOREIGN PATENT DOCUMENTS

| | | |
|---|---|---|
| CL | 2019-001219 A1 | 7/2019 |
| CN | 101074156 B | 5/2010 |
| DE | 195 05 989 | 8/1996 |
| DE | 196 10 247 | 2/1997 |
| EP | 3 031 868 | 6/2016 |
| FR | 384 903 | 4/1908 |
| FR | 2 923 242 | 5/2009 |
| FR | 2946641 A1 | 12/2010 |
| FR | 2 957 016 | 9/2011 |

(Continued)

OTHER PUBLICATIONS

Machine Translation of European Patent Specification No. EP 3,031,868 A1. (Year: 2016).*

(Continued)

*Primary Examiner* — Anthony J Green
(74) *Attorney, Agent, or Firm* — Oliff PLC

(57) ABSTRACT

A dry construction composition that is easily wet-sprayed by a screw pump to form an insulating and mechanically resistant material after hardening comprises: at least one binder that includes at least one primary binder comprising lime and/or at least one source of alumina and/or at least one source of calcium sulfate, at least one water retention agent, and preferably at least one surfactant; and at least one plant-based bio-based filler based on sunflower stalk and/or corn stalk and/or rape stalk, having a Bulk Density (BD) in kg/m³ that is less than 110. The ratio of the binder to the filler is between 2 and 9 in liters/kg. The composition can be mixed with water in a ratio of water/binder that is greater than or equal to 0.8 to form a wet composition. The wet composition can be sprayed onto a horizontal or vertical substrate or molded to a desired shape.

21 Claims, 4 Drawing Sheets

(56) References Cited

FOREIGN PATENT DOCUMENTS

| FR | 2 997 944 | 5/2014 |
| FR | 3 016 377 | 7/2015 |
| FR | 3 034 415 | 10/2016 |
| WO | 03/004435 | 1/2003 |
| WO | 2014/001712 | 1/2014 |
| WO | 2014/072533 A1 | 5/2014 |
| WO | 2015/082513 A1 | 6/2015 |
| WO | 2015/082515 | 6/2015 |
| WO | 2016/051085 | 4/2016 |

OTHER PUBLICATIONS

Magniont et al., "Use of plant aggregates in building ecomaterials", European Journal of Environmental and Civil Engineering, vol. 16, No. sup1, Jun. 1, 2012.
Jun. 2, 2020 Office Action issued in Singaporean Patent Application No. 11201903973W.
May 11, 2020 Office Action issued in Chilean Patent Application No. 201901220.
Binici, H. et al., "An Environmentally Friendly Thermal Insulation Material From Sunflower Stalk, Textile Waste and Stubble Fibres", Construction and Building Materials, vol. 51, (2014), pp. 24-33.
Dec. 15, 2017 Written Opinion of the International Searching Authority issued in International Patent Application No. PCT/FR2017/053006.

* cited by examiner

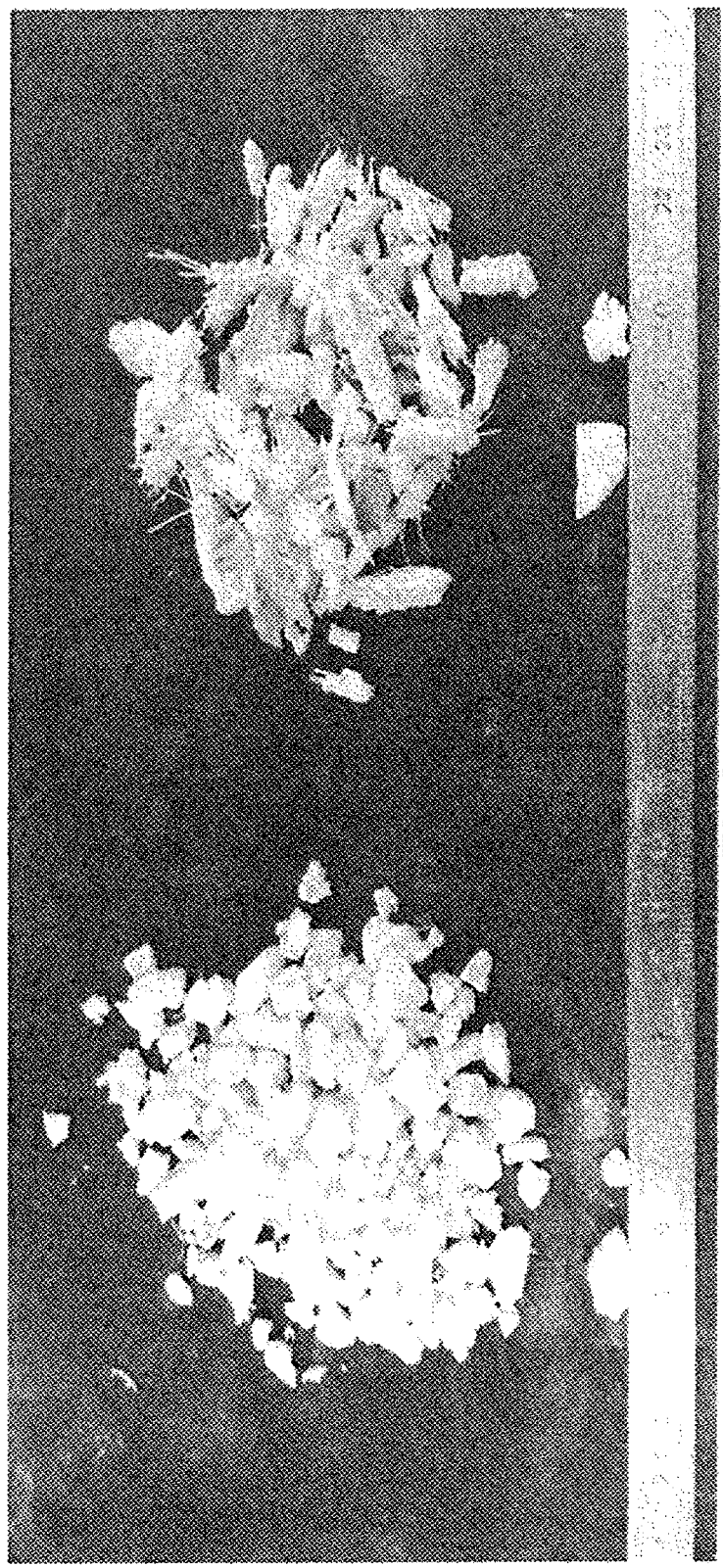

DRY CONSTRUCTION COMPOSITION WHICH CAN BE WET-SPRAYED BY MEANS OF SCREW PUMP AND COMPRISING A BINDER AND A BIO-BASED FILLER-PREPARATION AND USES OF SUCH A COMPOSITION

TECHNICAL FIELD

The technical field of the invention is that of dry, wet, and hardened construction compositions usable in construction, and applicable on horizontal surfaces by spreading, on vertical surfaces by spraying, and/or intended for the production of objects molded in molds or formwork.

These compositions comprise aggregates and fillers intended to be agglomerated or already agglomerated by at least one binder. Conventionally, these compositions are concretes or mortars.

The binders are inorganic and/or organic, preferably inorganic.

Specifically targeted construction compositions are those which comprise, in addition to and/or instead of inorganic aggregates, fillers from the industry of bio-based materials, in other words derived from biomass of plant or animal origin, preferably plant.

The invention also relates to a specific binder formulation suitable for bio-based binders, preferably of plant origin.

The invention also relates to the wet forms of these compositions and their preparation, as well as their applications in construction.

The construction members obtained from the above compositions are also an integral part of the invention.

Technological Background

In the current regulatory and political context of reducing the environmental footprint of buildings, reducing the consumption of fossil-based raw materials, reducing greenhouse gas emissions, and promoting the economics of sustainable development, the use of bio-based aggregates/plant fillers in construction compositions is booming.

Plant-based raw materials already in use in the building and construction sector include: wools from plant fibers, recycled natural textiles, cellulose wadding, straw from hemp or hemp chaff, hemp in other forms, flax shives, straw in baled or compressed form, wood in all its forms, etc.

These plant-based raw materials are known for their thermal and acoustic insulating properties and for their properties as reinforcements, fillers, and matrices.

The use of such plant-based raw materials in construction compositions, however, poses a number of difficulties, which include:
  very strongly hydrophilic and hyperabsorbent properties which result in excess water;
  excess water which lengthens drying and delays setting;
  excess water which has an impact on the mechanical strength of the hardened compositions (for example compressive strength);
  excess water which affects the durability of the hardened compositions;
  excess water which promotes the development of microorganisms that degrade the health and safety qualities of the hardened compositions.

Plant-based aggregates/fillers are generally characterized by a high water absorption capacity linked to their highly porous structure. Hemp straw, an aggregate/filler that comes from hemp stalk, is able to absorb water up to 3-4 times its weight. Once in contact with an inorganic binder paste, the plant-based aggregates/fillers absorb part of the mixing water, impacting the curing kinetics of the mortar. This type of aggregate/filler requires high water levels, resulting in long drying times of the insulating mortar.

The inventions of the earlier patent applications mentioned below, point out problems arising from the incorporation of plant-based raw materials into construction compositions.

Patent application WO03004435 indicates that the incorporation of hemp derivatives in concrete or mortar poses a very serious problem because of the highly hydrophilic nature of the hemp component. It can absorb up to about 400% of its weight of water or water-based liquid, which introduces a very strong concurrent reaction with the water contained in the mortar or concrete.

Patent application WO03004435A1 proposes addressing this problem without impacting the drying and setting characteristics of wet formulations, and without affecting the mechanical properties of the cured products resulting from said formulations. To this end, it discloses formulations for hemp concretes and mortars, comprising:
  components of hemp (and/or flax and/or cereal straw, such as oat husks or rice husks),
  a binder consisting, wholly or in part, of air lime;
  at least one admixture for the formation of very fine pores and capillaries forming an entire microcapillary system, so that the matrix water can be expelled to the surface during setting and drying, while external water (rain) is unable to penetrate this capillary network after drying; (plant colloids such as alginates and/or polysaccharides and any natural or synthetic starch derivatives and/or carraghenates);
  and at least one matrix hydrophobicizing admixture; (calcium, sodium, or magnesium polysulfonates, lignosulfonates, sodium sulfates, metallic soaps, maleates, oleates (Na), stearates of aluminum, of magnesium, of sodium, of lithium, sodium siliconates).

The very slow curing kinetics (more than 24 hours) of these formulations do not allow creating multiple layers of coating on a substrate within application times compatible with construction productivity requirements. The applicator must wait too long between each layer (pass), namely more than a day, which is unacceptable, particularly due to the cost of keeping the scaffolding in place.

In addition, these wet formulations cannot be pumped in a screw pump because of the high volumes of hemp they contain. However, "pumpability" in a screw pump is essential to the spray application onto substrates (walls, facades, ceilings, floors . . . ) of these wet formulations for hemp concretes and mortars. Indeed, almost all the spray machines of applicators (renderers) are equipped with a screw pump. This requires mortar manufacturers to offer mixed formulations able to pass through conventional screw pumps.

It has been found that the use of plant aggregates/fillers such as hemp in the formulations according to WO03004435A1 poses jamming/clogging problems for screw pumps, when these formulations contain sufficiently large volumes of hemp to ensure low thermal conductivity lambda values, for example less than 0.1 W/mK, and to provide the thermal insulation performance required.

The formulations according to WO03004435A1 do not meet this compromise between a sufficient dry volume of hemp relative to binder to obtain the required thermal insulation, and the pumpability necessary for the application of wet formulations.

In addition, the hardened products obtained from these known wet formulations do not exhibit good "durability" in aging cycles (EOTA External Thermal Insulation standard ETAG 004).

Patent application WO2014001712A1 discloses construction materials which are presented as being readily prepared from plant aggregate and as having excellent thermal and acoustic insulation properties, but also a setting, curing, and drying time that reduces the appearance of the degradation phenomena in said material that are generally observed with construction materials prepared from a plant aggregate. These construction materials comprise:
- 10% to 60% of a hydraulic binder and/or an air binder (Vicat CNP PM—Prompt Natural Cement, possibly air lime);
- 16% to 50% of a plant aggregate: seed hairs, in particular cotton, phloem fibers from plant stalks such as hemp fiber, hemp straw, flax shives, wood chips, cork balls, or miscanthus; fibers extracted from the leaves or trunk, in particular sisal; and fruit husks such as coconut (hemp fiber, hemp straw, flax shives, and wood chips);
- 0.05% to 5% of a water retention agent, for example chosen from cellulose ethers (methyl hydroxylethyl cellulose);
- 10% to 50% water, preferably 20 to 40%.
- possibly citric acid
- possibly sodium carbonate The construction materials of the examples (concretes) are implemented using a planetary mixer and then compacted in cylindrical molds. Their composition and their implementation enable reducing the amount of mixing water: 20 to 40%.

These construction materials contain large volumes of plant aggregates/fillers and are not pumpable in a screw pump in wet form. As a result, these building materials cannot be utilized by pumping them through a screw pump and spraying them (rendering machine).

This inability to pump through a screw pump also stems from the fact that these materials are quick-setting, as shown by the examples of WO2014001712A1 where the setting times are less than 1 hour, which is incompatible with passage through a spray machine.

To improve the construction compositions in which plant-based additives are incorporated into a lime-based binder matrix (for example hemp to create blocks such as Chanvribloc®), these compositions requiring very long curing times which retard the setting of hydraulic binders, patent application FR2997944A1 describes hemp concrete compositions comprising:
- a hydraulic binder (Portland cement, Ciment Fondu®, calcium sulfoaluminate cement, calcium aluminate cement, hydraulic lime, air lime); in particular Portland cement, Ciment Fondu®;
- plant-based aggregates consisting of hemp straw (hemp), corn stover, sorghum, flax shives, miscanthus (silver grass), rice hulls (rice husk), sugar cane bagasse, cereal straw, sunflower straw, corn straw, kenaf, coconut, olive pits, bamboo, wood pellets (for example shredded spruce), wood chips, and mixtures thereof.
- trivalent cations (iron salts—ferric chloride or iron nitrate—or aluminum salts);
- a limestone filler,
- a surfactant foaming agent,
- optionally a hydraulic binder set accelerator (calcium/lithium salts);
- optionally a water-reducing agent, a plasticizer, or a superplasticizer;
- and water, the water/binder mass ratio being from 0.3 to 2.5.

These compositions do not include a water retention agent and their water retention is too low to allow pumping through a screw pump without wringing the wet material, which causes blockage/jamming in the screw pump. These compositions are therefore not pumpable with a screw pump and are not suitable for wet spraying. They are intended to be poured into place.

Also known are compositions (coatings, mortars, concretes, etc.) of an insulating nature marketed under the trade name TRADICAL® by the BCB company. These compositions comprise an inorganic binder based on air lime and a hemp filler (CHANVRIBAT® 75 brand). Depending on the recommended combinations, these compositions comprise between 44 and 165 kg of binder per 200 liters of hemp straw. These compositions can be put in place by pouring, compacting, or dry or semi-wet spraying, but cannot be applied by wet spraying with a screw pump.

The prior art construction compositions with bio-based aggregates/fillers mentioned above are not compatible with wet application methods, which require that the wet composition be pumpable and sprayable on any type of vertical, slanted, or horizontal substrate.

These wet application methods ensure better homogeneity and repeatability, while minimizing aggregate/filler losses from splattering off the projection surface. They are commonly used by applicators called renderers to create coatings on surfaces, and consist of pumping and spraying a homogeneous mixture composed of a formulated binder, an aggregate/filler, and the entirety of the mixing water. The spray machines in widespread use by renderers are eccentric screw pumps having a 2L6 or 2R6 pump jacket found on machines such as Putzmeister S5, SP5, SP 11, Bunker SS8, S28R, S38, Lancy PH9B or PH9B-R, Turbosol Talent DMR.

Wet application methods require a specific formulation. Indeed, the binder must allow pumping the plant-based mortar (such as hemp) without phase separation (spinning of the compressed bio-based aggregate/filler in the jacket) while guaranteeing the mortar will hold (avoiding mortar creep when applied on vertical surfaces) on the substrate.

There also exist plant-based mortars of an insulating nature that are utilized, either manually or mechanically, with specific pumping-spraying methods. These so-called "dry" and "semi-wet" methods require specific machines which are sometimes expensive. However, these methods do not guarantee mortar homogeneity and satisfactory coating of the plant fibers, and have a negative impact on durability during climatic variations, and render it vulnerable to microorganisms, rodents, and fire. Such methods were developed mainly for mortars based on hemp straw, in order to reduce the amount of mixing water. According to these methods, the plant-based aggregate/filler is dry sprayed with the spray gun, the aggregate/filler being coated at the outlet or in the spray gun. The final properties and the homogeneity of the sprayed mortar are strongly affected by the settings of the machine, the distance between the nozzle and the wall when spraying, and the weather conditions. These methods generate significant losses of aggregates/fillers from backsplattering off the substrate (about 10-20%). This mode of projection does not guarantee optimal reproducibility in the creation of insulating mortar coatings on vertical substrates.

To date and to the knowledge of the inventors, no insulating mortar/concrete based on plant-based aggregate/filler (bio-based material), having a thermal conductivity ($\lambda$) of less than or equal to 0.2, preferably 0.1 W/mK, has been developed for wet application using screw pump spray machines, such as the machines used by renderers.

Objectives of the Invention

In the absence of an insulating mortar/concrete based on pumpable plant-based aggregate/filler for the creation of coatings on substrates (vertical, horizontal, or inclined) of buildings, in particular for the thermal renovation of exterior walls, for the creation of insulating screeds on horizontal substrates of buildings, for filling insulating walls, in particular in houses with wooden frames, or even for the production of insulating prefabrication members, the invention aims to satisfy at least one following objectives:

provide a dry mortar/concrete composition comprising plant-based raw materials, which can be wet sprayed by means of a screw pump and which enables the creation of an insulating mortar/concrete of low thermal conductivity ($\lambda$);

provide a dry mortar/concrete composition comprising plant-based raw materials, which can be wet sprayed by means of a screw pump, which enables the creation of an insulating mortar/concrete that is fast-curing without delaying the setting, for example allowing "recoverability" with 3 cm passes every 24 hours (multilayers achievable within a time frame compatible with the productivity required for construction sites in the construction sector);

provide a dry mortar/concrete composition comprising plant-based raw materials, which can be wet sprayed by means of a screw pump, which enables the creation of an insulating mortar/concrete resulting in cured products having durable mechanical performance, even in severe weather conditions, for example freeze-thaw or moisture-freeze cycles as early as 28 days after application;

provide a dry mortar/concrete composition comprising plant-based raw materials, which can be wet sprayed by means of a screw pump, which enables the creation of an insulating mortar/concrete in particular having reduced vulnerability to damage caused by the growth of micro-organisms, rodent activity, or even fire;

provide a dry mortar/concrete composition comprising plant-based raw materials, which can be wet sprayed by means of a screw pump, which enables the creation of an insulating mortar/concrete ensuring homogeneity of the material in both the wet state and the cured dry state by good coating of the particulate fillers, so as to yield good performance for thermal and acoustic insulation;

provide a dry mortar/concrete composition comprising plant-based raw materials, which enables the creation of an insulating mortar/concrete which can be wet sprayed by means of a screw pump without wasting composition due to backsplattering from the substrate;

provide a dry mortar/concrete composition comprising plant-based raw materials, which enables the creation of an insulating mortar/concrete which can be wet sprayed by means of a screw pump, which provides a homogeneous deposit on the substrate and does so in a repeatable manner;

provide a wet mortar/concrete composition, comprising the dry composition referred to in the above objectives and water, which can be wet sprayed by means of a screw pump and which satisfies at least one of the above objectives;

provide a binder intended for the dry composition referred to in the above objectives and satisfying at least one of the above objectives.

provide a kit comprising the binder and the plant-based filler intended for preparing the dry composition referred to in the above objectives and satisfying at least one of the above objectives.

provide a method for applying an insulating mortar/concrete satisfying at least one of the above objectives.

BRIEF DESCRIPTION OF THE INVENTION

These objectives and others are achieved by the present invention, which in a first aspect concerns a dry mortar composition that can be wet sprayed, in particular by means of a screw pump, enabling the creation of an insulating mortar, characterized in that:

(i) it comprises:
-A- at least one binder which itself comprises:
  -A1- at least one primary binder comprising lime and/or at least one source of alumina and/or at least one source of calcium sulfate, preferably at least one source of alumina;
  -A2- at least one water retention agent;
  -A3- preferably at least one surfactant;
-B- at least one bio-based filler of plant origin based on sunflower stalk and/or corn stalk and/or rape stalk, having a bulk density (BD) that is less than 110 kg/m$^3$; preferably between 10 and 80;
the ratio B/A—volume of dry filler B in liters/mass of dry binder A in kg—being, in increasing order of preference, between: 2 and 9; 2.5 and 8; 4 and 7.9; 4.6 and 7.5 L/kg;
(ii) it is intended to be mixed with a liquid, preferably water, in a mass ratio of water to A comprised between 0.8 and 5, preferably between 1 and 4, and more preferably between 1.5 and 3.5;
(iii) once mixed in this manner, it is pumpable in a screw pump as defined in a test T1, defined below.

It is to the credit of the inventors that they have successfully developed this dry composition, precursor of a wet formulation that can be pumped and sprayed, in particular with a screw pump of the type equipping, for example, the spray machines used by renderers, this occurring without losing the desired insulating properties of these mortars.

In addition to the pumpability of the wet formulation, the composition according to the invention satisfies a "sprayability" specification, meaning, for example, that said wet formulation, as soon as it is sprayed and applied in a layer of about 5 cm onto a vertical substrate of concrete blocks, holds to this vertical substrate without creep and without flow, for the time required for it to harden and adhere in hardened form to said vertical substrate, at an ambient temperature comprised for example between 5° C. and 35° C. and at a relative humidity RH of between 20 and 90 percent.

Preferably, and still with the aim of improving its wet application and its pumpability for a time sufficient to be compatible with construction requirements, this composition is characterized, once mixed with a liquid—preferably water—in a mass ratio of water to A of between 0.8 and 5, by a setting time comprised between 1 and 24 hours as measured by a method M1, preferably between 1 and 8 hours.

According to another of its aspects, the invention relates to a binder (A) intended in particular for the composition according to the invention, characterized in that it comprises—as % weight/weight on a dry basis and in increasing order of preference:
- -A1- primary binder: [5-95]; [10-85]; [15-75]; in which:
    - lime: [10-95]; [20-70]; [30-60];
    - source of alumina and/or source of calcium sulfate: [1-90]; [5-30]; [7-15];
- -A2- water retention agent: [0.1-5]; [0.5-3]; [0.8-2];
- -A3- surfactant: [0.01-1]; [0.05-0.5];
- -A4- secondary binder [0-85]; [5-50]; [7-15];
- -A5- inorganic lubricating filler having a particle size d90 that is less than 100 µm: [0-40]; [0-30]; [0-20];
- -A6- inorganic spacer filler having a particle size d90 that is greater than or equal to 100 µm: [0-40]; [0-35]; [0-30];
- -A7- water repellent admixture: [0-1.5]; [0-1]; [0-0.5];
- -A8- set retardant admixture: [0-3]; [0-2]; [0-1];
- -A9- set accelerator admixture: [0-3]; [0-2]; [0-1];
- -A10- thickening admixture: [0-2]; [0.1-1]; [0.2-0.8].

According to another of its aspects, the object of the invention is a kit comprising the binder (A) and one or more bio-based fillers (B), preferably of plant origin, of the dry composition according to the invention.

According to another of its aspects, the invention relates to a wet mortar composition, obtained in particular from the composition according to the invention, that is pumpable in a screw pump with an air gap (E) between rotor and stator comprised between 4 and 30 mm, and preferably with a 2L6 or 2R6 jacket.

According to another of its aspects, the invention relates to a hardened mortar obtained from the wet composition according to the invention, characterized by a thermal conductivity λ that is less than or equal to—in W/mK and in increasing order of preference—0.15; 0.12; 0.1; 0.08; 0.07.

According to another of its aspects, the invention relates to a system of External Thermal Insulation—ETI—or Internal Thermal Insulation—ITI—comprising hardened mortar according to the invention applied in layer(s) to a total thickness of between 2 and 30 cm, preferably between 5 and 15 cm, and covered with a waterproofing coating having a thickness of at least 10 mm, characterized in that the hardened mortar comprises lime and at least one source of alumina and in that said system satisfies the test according to the EOTA ETAG 004 standard for ETI.

Finally, the invention also relates to a method for applying an insulating mortar, comprising the following steps:
1° preparing a mixture of liquid (preferably water) and of the dry composition as referred to above, in other words comprising the binder (A) and the bio-based filler (B), in a mass ratio of water/binder (A) as indicated below, in a gradient of increasing order of preference:
   [Water/A]≥0.8; [Water/A]≥1.0; [Water/A]≥1.5;
   0.8≤[Water/A]≤5; 1≤[Water/A]≤4; 1.5≤[Water/A]≤3.5;
2° preferably pumping the mixture prepared in step 1, by means of a screw pump,
3.1° spraying the mixture prepared in step 1 on a vertical or inclined substrate, or to fill a wood or metal framework structure on site, or to create prefabricated walls; or
3.2° spraying and spreading on a horizontal plane to create a screed; or
3.3° pouring the mixture prepared in step 1 into a formwork to create a wall, to fill between two walls, or into a mold to create a prefabricated member and in particular blocks or precast wall members or panels.

DESCRIPTION OF FIGURES

The attached

The attached

FIG. 3 shows sunflower pith particles on the right and corn pith particles on the left.

The attached

The attached

DEFINITIONS

Throughout this present description, any use of the singular indiscriminately denotes the singular or the plural.

Figure 2:
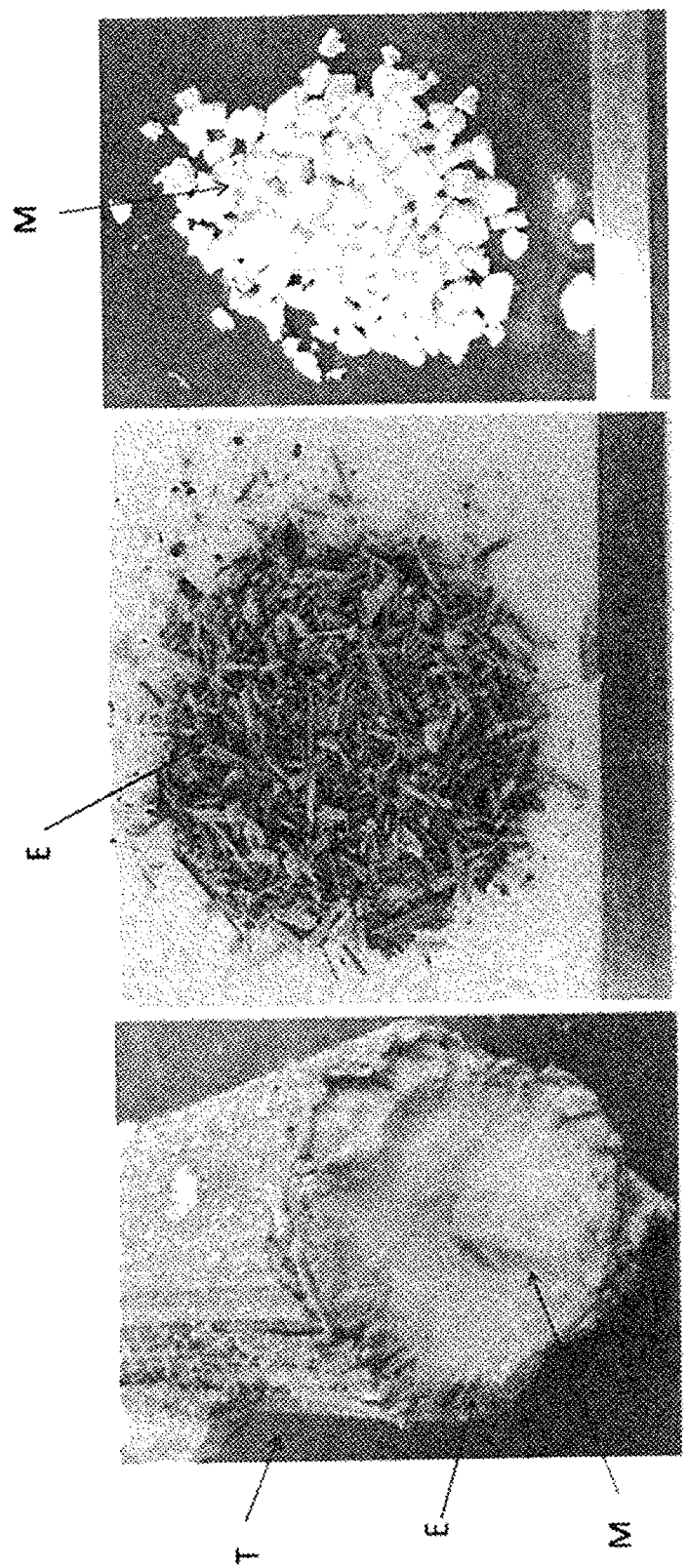
FIG. 2 shows a sunflower stalk T in a cross-sectional view in the left photo, sunflower skin particles in the center photo, and sunflower pith particles in the right photo.

The definitions given below as examples may be used in interpreting the present description:

"mortar" or "concrete" indiscriminately refers to a dry or wet or hardened mixture of one or more organic and/or inorganic binders, fillers of inorganic and/or plant origin, and possibly fillers and/or additives and/or admixtures;

"Insulating" mortar: refers to a T grade mortar, "mortar for thermal insulation coating" according to EN 998-1 or a concrete forming a layer for which the thermal conductivity λ, measured after complete drying according to the hot plate method, reference NF EN 12664, is less than or equal to—in W/mK and in ascending order of preference—0.2; 0.15; 0.12; 0.1; 0.08; 0.07;

"Complete drying" means stabilization of the mass of the hardened mortar, at plus or minus 3%, over 24 hours, for a storage at 50% relative humidity;

"stalk" means the stem or stalk of the plant constituting the raw material of the bio-based aggregates, this stalk consisting of the skin and a core formed by the pith. The appended FIG. 2 shows a cross-sectional view of a sunflower stalk T in the left photo. The darker peripheral part is the skin (E) and the lighter central part is the pith (M).

"pith" of the "stalk": core of the stalk, having an BD less than 60 kg/m$^3$.

"skin" of the "stalk": consisting of everything that is not pith in the stalk, the skin has a BD>110 kg/m$^3$.

Figure 4B:
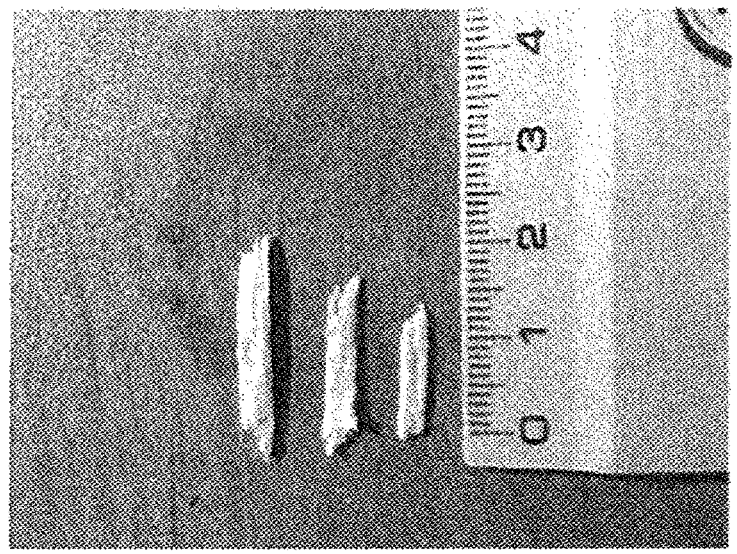
FIG. 4B shows rape pith particles.

"pith particles": non-acicular (roughly spherical) or acicular particles having a BD<60 kg/m$^3$. The photo on the right in FIG. 2 shows sunflower pith particles. The particles on the left in the photo of the appended FIG. 3 are non-acicular particles of sunflower pith. The particles on the right in the photo of the appended FIG. 3 are non-acicular particles of corn pith. The appended FIG. 4B shows acicular particles of rape pith.

Figure 4A:
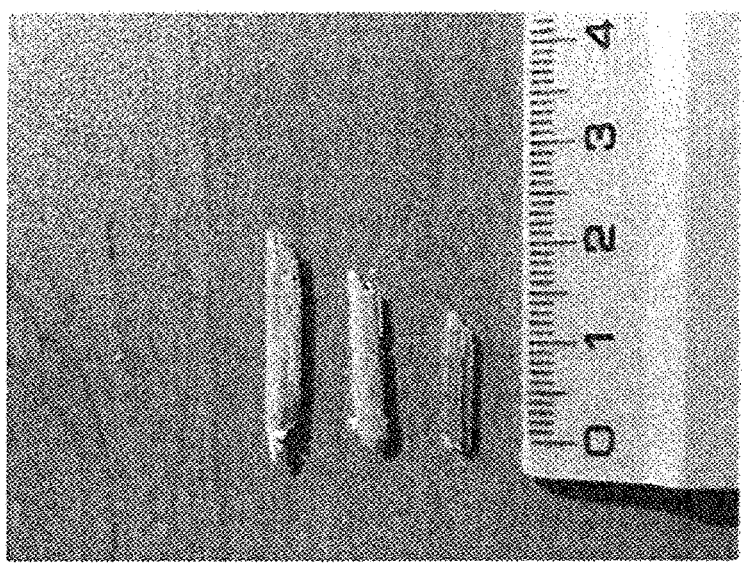
FIG. 4A shows rape hull particles.

"skin particles": acicular particles (rods) having a BD>110 kg/m$^3$. The appended FIG. 2 shows sunflower skin particles in the center photo. The appended FIG. 4A shows rape skin particles.

"stalk particles" comprise skin particles (rods) and pith particles.

"complete pass-through particle size": 100% of the aggregates are smaller than the sieve.

The particle "size" of the bio-based filler (B) corresponds to the largest of the three dimensions of each particle;

A particulate filler has a size less than or equal to X mm if its d90 is less than or equal to X mm; The term "d90" refers in this description to the particle size criterion where 90% of the particles are smaller than "d90". The particle size is measured by sieving according to the EN 12192-1 standard;

"about" or "substantially" means within plus or minus 10%, or even plus or minus 5%, relative to the unit of measurement used;

"polymer" indiscriminately means "homopolymer" and "copolymer" and/or a mixture of polymers;

"lightweight filler" is a filler having a bulk density less than or equal to 750 kg/m$^3$, and preferably less than 500 kg/m$^3$;

"liquid": water or aqueous dispersion, aqueous emulsion, or aqueous solution;

"between Z1 and Z2" means that one and/or the other of the end values Z1, Z2 is or is not included in the interval [Z1, Z2].

"Recoverability" is the minimum time required before applying a new layer of wet mortar formulation on a previous layer of this wet formulation that has now hardened. This minimum time corresponds to a compressive strength, of the previous layer which has hardened, that is greater than or equal to 0.1 MPa.

DETAILED DESCRIPTION OF THE INVENTION

Binder -A-

The binder -A- according to the invention is preferably inorganic and comprises at least one primary binder A1 and possibly at least one secondary binder.

-A1- Primary Binder:

The primary binder -A1- comprises lime and/or at least one source of calcium alumina and/or a source of calcium sulfate.

According to a preferred embodiment of the invention, the primary binder A1 comprises lime and at least one source of alumina.

In a noteworthy variant of this preferred embodiment, the mass ratio on a dry basis of [(source of alumina)/(lime)] is less than or equal to—in increasing order of preference—2.3; 2.1; 1.9; 1.7; 1.5; 1.3; 1.1; 0.9.

The lime is an air and/or hydraulic lime.

The air lime concerned is of the type in accordance with standard NF EN 459-1, preferably chosen from the group comprising—ideally consisting of—:

an air calcitic lime (CL) containing calcium oxide (CaO) and/or calcium hydroxide (Ca(OH)2) for which the sum of CaO+MgO is at least 70% and the MgO content<5%;

dolomitic lime (DL) containing calcium magnesium oxide (CaO MgO) and/or calcium magnesium hydroxide (Ca(OH) 2Mg(OH)2) for which the sum of CaO+MgO is at least 80%, and the MgO content varies from 5% to more than 30%.

or their mixtures.

The air lime used can be in various forms such as a paste, a powder, or, for quicklime, the rock itself.

The hydraulic lime concerned is of the type complying with the NF EN 459-1 standard.

Any lime mixture of any type, in any form whatsoever, can contain the composition of the invention.

The source of alumina is preferably selected from the following types: calcium aluminate cements (CAC), calcium sulfoaluminate (CSA) cements, binders with a high content of cementitious phases rich in alumina, or mixtures of these types used alone or in combination.

According to one variant, the source of alumina is chosen from the following types: quick-setting cements (for example quick-setting natural cements), geopolymer cements, slags, calcium aluminate cements (CAC), calcium sulfoaluminate (CSA) cements, or mixtures of these types used alone or in combination.

According to another variant, the source of alumina is selected from hydraulic binders comprising:

at least one phase selected from $C_3A$, $CA$, $C_{12}A_7$, $C_{11}A_7CaF_2$, $C_4A_3\$$ (ye'elimite), $C_2A_{(1-x)}F_x$ (where C→CaO; A→Al$_2$O$_3$; F→Fe2O3 and x is a member of[0, 1]), amorphous hydraulic phases having a mole ratio C/A of between 0.3 and 15, and such that the cumulative concentrations of Al$_2$O$_3$ in these phases are between:

3 and 70% by weight of the total of the hydraulic binder, preferably between 7 and 50% by weight, and more preferably between 20 and 30% by weight.

CACs are cements comprising a mineralogical phase C4A3$, CA, C12A7, C3A, or C11A7CaF2, or mixtures thereof, for example such as Ciments Fondu®, sulfoaluminate cements, calcium aluminate cements according to the European standard NF EN 14647 of December 2006, cement obtained from clinker as described in patent application WO2006/018569, or mixtures thereof.

Sulfoaluminate clinkers are obtained from a mixture of calcium carbonate in limestone form, bauxite, or another source of alumina (for example dross by-product), and calcium sulfate, which is either gypsum, anhydrite, or hemihydrate, or mixtures thereof. The specific component at the end of the manufacturing process is ye'elimite, C4A3$. In particular, it is possible to use quick-setting cements or sulfoaluminate cements having a ye'elimite content of between 3% and 70%, which may be available from Vicat, Italcementi, Lafarge-Holcim, Polar Bear, Liu Jiu, Readerfast.

For example, a quick-setting natural cement is composed of a clinker containing from 0% to 35% C3S;

from 10% to 60% C 2S;

from 1% to 12% C 4AF;

from 1% to 10% C 3A;

from 5% to 50% CaCO 3 (calcite);

from 10% to 15% Ca 5 (SiO 4) 2CO 3 (spurrite);

from 3 to 10% sulfate phases: ye'elimite (C 4A 3 $), Langbeinite (K 2Mg 2(SO 4) 3, anhydrite (C$), and from 10 to 20% lime, periclase, quartz, and/or one or more amorphous phases.

According to another variant, the source of alumina is selected from hydraulic binders having an alumina content (expressed as Al$_2$O$_3$) comprised within the following ranges—as % weight on a dry basis and in increasing order of preference—[20; 70]; [25; 65]; [30; 72]; [35; 58].

Advantageously, the source of calcium sulfate is chosen from anhydrites, gypsums, calcium sulfate hemihydrates, supersulfated cements, and their mixtures.

The source of calcium sulfate, natural or synthetic, is chosen from anhydrites, gypsums, calcium sulfate hemihydrates, or mixtures of these types used alone or in combination.

-A2- Water Retention Agent:

Preferably, the water retention agent -A2- has a water retention greater than or equal to—in increasing order of preference—50, 60, 70, 80, 90%, according to retention measurement method M2, the water retention agent preferably being selected from the polysaccharides, and more preferably from the group comprising—or more preferably consisting of—ethers of cellulose or starch and mixtures thereof; methylcelluloses, hydroxyethyl celluloses, hydroxypropyl celluloses, hydroxypropyl methylcelluloses, hydroxyethyl methylcelluloses, and mixtures thereof; modified or unmodified guar ethers and mixtures thereof; or a mixture of these different types. The water retention agent A2 preferably has a viscosity of 2% in water, measured with the HAAKE Rotovisco RV100 rheometer, shear rate of 2.55 $s^{-1}$ at 20° C. between 5,000 and 70,000 cP, preferably between 20,000 and 50,000.

The water retention agent A2 has the property of retaining the mixing water before setting. The water is thus held in the mortar or concrete paste, which gives it very good adhesion and good hydration. To a certain extent, it is less absorbed on the substrate; release at the surface is limited and there is thus little evaporation.

-A3- Surfactant:

The surfactants are preferably chosen from:
i. sources of anionic surfactants such as alkyl sulfates, alkyl ether sulfates, alkaryl sulfonates, alkyl succinates, alkyl sulfosuccinates, alkyl sarcosinates, alkyl phosphates, alkyl ether phosphates, alkyl ether carboxylates, and alpha olefin sulfonates, preferably sodium lauryl sulfate,
ii. nonionic surfactants such as fatty alcohol ethoxylates, mono or di alkyl alkanolamides, alkyl polyglucosides,
iii. amphoteric surfactants such as alkyl amine oxides, alkyl betaines, alkyl amidopropyl betaines, alkyl sulfobetaines, alkyl glycinates, alkyl amphopropionates, alkyl amidopropyl hydroxysultaines.
iv. polyether polyols, hydrocarbon molecules, silicone molecules, hydrophobic esters,
v. nonionic surfactants,
vi. polyoxiranes,
vii. or their mixtures;

As ionic surfactants, one can list the following non-limiting examples: alkyl ether sulfonates, hydroxyalkyl ether sulfonates, alpha olefin sulfonates, alkyl benzene sulfonates, alkyl ester sulfonates, alkyl ether sulfates, hydroxyalkyl ether sulfates, alpha olefin sulfates, alkyl benzene sulfates, alkyl amide sulfates, and their alkoxylated derivatives (particularly ethoxylated (OE) and/or propoxylated (OP)), the corresponding salts, or mixtures thereof. As ionic surfactants, one can also list the following non-limiting examples: saturated or unsaturated fatty acid salts and/or their alkoxylated derivatives, particularly (OE) and/or (OP) (for example sodium laurate, sodium palmitate or sodium stearate, sodium oleate), methyl and/or sodium alpha sulfonated laurates, alkylglycerol sulfonates, sulfonated polycarboxylic acids, paraffin sulfonates, N-acyl N-alkyl taurates, alkyl phosphates, alkyl succinamates, alkyl sulfosuccinates, sulfosuccinate monoesters or diesters, alkyl glucoside sulfates.

As nonionic surfactants, one can list the following non-limiting examples: fatty alcohol ethoxylates, alkoxylated alkyl phenols (particularly (OE) and/or (OP)), aliphatic alcohols particularly in 08-022, products resulting from the condensation of ethylene oxide or propylene oxide with propylene glycol or ethylene glycol, products resulting from the condensation of ethylene oxide or propylene oxide with ethylenediamine, the amides of alkoxylated fatty acids (particularly (OE) and/or (OP)), alkoxylated amines (in particular (OE) and/or (OP)), alkoxylated amidoamines (particularly (OE) and/or (OP)), amine oxides, alkoxylated terpene hydrocarbons (particularly (OE) and/or (OP)), alkyl poly-glucosides, amphiphilic polymers or oligomers, ethoxylated alcohols, sorbitan esters or ethoxylated sorbitan esters. As amphoteric surfactants, one can list the following as non-limiting examples: betaines, imidazoline derivatives, polypeptides, or lipoamino acids. More particularly, betaines that are suitable according to the invention may be chosen from cocamidopropyl betaine, dodecyl betaine, hexadecyl betaine, octadecyl betaine, phospholipids and their derivatives, amino acid esters, water-soluble proteins, water-soluble protein esters, and mixtures thereof. As cationic surfactants, one can also list the following as non-limiting examples: laurate amino oxide, propyl cocoate amino oxide, caprylamphocarboxy glycinate, lauryl propionate, lauryl betaine, the tall oil bis 2-hydroxyethyl betaine. According to one particular embodiment of the invention, the nonionic foaming agent may be associated with at least one anionic or cationic or amphoteric foaming agent.

As amphiphilic surfactants, one can list the following non-limiting examples: polymers, oligomers, or copolymers which are at least miscible in the aqueous phase. The amphiphilic polymers or oligomers may have a statistical distribution or a multiblock distribution. Amphiphilic polymers or oligomers used according to the invention are chosen from block polymers comprising at least one hydrophilic block and at least one hydrophobic block, the hydrophilic block being obtained from at least one nonionic and/or anionic monomer. As examples of such amphiphilic polymers or oligomers, we can list in particular the polysaccharides having hydrophobic groups, in particular alkyl groups, polyethylene glycol and its derivatives. As examples of amphiphilic polymers or oligomers, we can also list polyhydroxystearate—polyethylene glycol—polyhydroxystearate triblock copolymers, branched or unbranched acrylic polymers, or hydrophobic polyacrylamide polymers.

As for nonionic amphiphilic polymers, particularly alkoxylated (in particular (OE) and/or (OP)), these are more particularly chosen from polymers of which at least a part (at least 50% by mass) is water-miscible. As examples of polymers of this type, we can list polyethylene glycol/polypropylene glycol/polyethylene glycol triblock copolymers. Preferably, the foaming agent used according to the invention is a protein, in particular a protein of animal origin, more particularly keratin, or a protein of plant origin, more particularly a water-soluble protein of wheat, rice, soy, or grains. As examples we can list sodium laurate from wheat protein hydrolyzate, laurate from oat protein hydrolyzate, or sodium cocoate from apple amino acids. Preferably, the foaming agent used according to the invention is a protein having a molecular weight between 300 and 50,000 Daltons. The foaming agent is used according to the invention at a concentration of 0.001 to 2%, preferably from 0.01 to 1%, more preferably from 0.005 to 0.2 by mass of foaming agent relative to the mass of the binder.

-A4- Secondary Binder:

In a preferred embodiment of the invention, the composition comprises at least one secondary binder -A4-, different from binder -A1-, and selected from Portland cements, quick-setting natural cements, and slags, geopolymer cements, natural pozzolans, sodium silicates, potassium silicates, lithium silicates, organic binders, or mixtures thereof.

For example, an artificial Portland cement suitable as a secondary binder A4 comprises 20% to 95% of a clinker containing:
- 50% to 80% C 3S;
- 4% to 40% C 2S;
- 0% to 20% C 4AF; and
- 0% to 2% C 3A;

0% to 4% of $;

0% to 80% blast furnace slag, silica fume, pozzolans, and/or fly ash.

Alternatively, A4 is an organic binder selected from the group comprising—ideally consisting of—: redispersible polymer powders, epoxy (co)polymers, (co)polyurethanes, and mixtures thereof.

According to a noteworthy feature of the invention, the composition further comprises:
- -A5- an inorganic lubricating filler having a particle size d90 that is less than 100 μm;
- -A6- an inorganic spacer filler having a particle size d90 that is greater than or equal to 100 μm;
- and possibly one or more admixtures.

-A5- Inorganic Lubricating Filler:

The inorganic lubricating filler having a particle size d90 that is less than 100 μm is preferably chosen
- from natural and synthetic silicate minerals, and more preferably from clays, micas, kaolins and metakaolins, silica fumes, fly ash, and mixtures thereof,
- from limestone or silico-limestone fillers,
- from fly ash,
- or from mixtures thereof.

-A6- Inorganic Spacer Filler:

The inorganic filler having a particle size d90 of greater than or equal to 100 μm is preferably chosen from the siliceous, calcareous, or silico-calcareous sands, lightweight fillers, which are more particularly chosen from expanded or unexpanded vermiculite, expanded or unexpanded perlite, expanded or unexpanded glass beads (hollow glass beads (type 3M®) or expanded glass granules (Poraver®, Liavesr), silica aerogels, expanded or unexpanded polystyrene, cenospheres (litefil), hollow alumina balls, expanded or unexpanded clays, pumices, silicate foam grains, rhyolite (Noblite®), or mixtures thereof.

-A7- Water Repellent Admixture:

The water repellent is preferably chosen from the group comprising, or more preferably consisting of, fluorinated, silanized, siliconated, siloxanated agents, metal salts of fatty acids, and mixtures thereof, preferably chosen from sodium, potassium, and/or magnesium salts of oleic and/or stearic acids, and mixtures thereof.

-A8- Set Retardant Admixture:

The set retardant is preferably chosen from the group comprising, or more preferably consisting of, calcium chelating agents, carboxylic acids and their salts, polysaccharides and their derivatives, phosphonates, lignosulfonates, phosphates, borates, as well as the lead, zinc, copper, arsenic, and antimony salts, and more particularly is chosen from tartaric acid and its salts, preferably its sodium or potassium salts, citric acid and its salts, preferably its sodium salt (trisodium citrate), sodium gluconates, sodium phosphonates, sulfates and their sodium or potassium salts, and mixtures thereof.

-A9- Set Accelerator Admixture:

The set accelerator is preferably chosen from the group comprising, or more preferably consisting of, the alkaline and alkaline-earth salts of hydroxides, of halides, of nitrates, of nitrites, of carbonates, of thiocyanates, of sulfates, of thiosulphates, of perchlorates, of silica, of aluminum, and/or chosen from carboxylic and hydrocarboxylic acids and their salts, alkanolamines, silicated insoluble compounds such as silica fiumes, fly ash, or natural pozzolans, silicated quaternary ammoniums, finely divided inorganic compounds such as finely divided silica gels or calcium and/or magnesium carbonates, and mixtures thereof; this complementary set accelerator (e) preferably being chosen from the group comprising or more preferably consisting of chlorides and their sodium or calcium salts, carbonates and their sodium or lithium salts, sulfates and their sodium or potassium salts, calcium hydroxides and formates, and mixtures thereof.

-A10- Thickening Admixture;

A10 is an admixture that is different than A2 and makes it possible to improve the yield point of the mortar (mortar hold on substrate).

Preferably, this thickening admixture is chosen from the group comprising or more preferably consisting of polysaccharides and their derivatives, polyvinyl alcohols, mineral thickeners, linear polyacrylamides, and mixtures thereof.

Binder A Compositions:

In one embodiment, the composition according to the invention is characterized in that binder A comprises—as % weight/weight on a dry basis and in increasing order of preference:
- -A1- primary binder: [5-95]; [10-85]; [15-75];
- in which:
  - lime: [10-95]; [20-70]; [30-60];
  - source of alumina and/or source of calcium sulfate: [1-90]; [5-30]; [7-15];
- -A2- water retention agent: [0.1-5]; [0.5-3]; [0.8-2];
- -A3- surfactant: [0-2]; [0.01-1]; [0.05-0.5];
- -A4- secondary binder [0-85]; [5-50]; [7-15];
- -A5- inorganic lubricating filler having a particle size d90 that is less than 100 μm: [0-40]; [0-30]; [0-20];
- -A6- inorganic spacer filler having a particle size d90 that is greater than or equal to 100 μm: [0-40]; [0-35]; [0-30];
- -A7- water repellent admixture: [0-1.5]; [0-1]; [0-0.5];
- -A8- set retardant admixture: [0-3]; [0-2]; [0-1];
- -A9- set accelerator admixture: [0-3]; [0-2]; [0-1];
- -A10- thickening admixture: [0-2]; [0.1-1]; [0.2-0.8].

In another embodiment, the composition according to the invention is characterized in that binder A comprises—as % weight/weight on a dry basis and in increasing order of preference:
- -A1- primary binder: [5-95]; [10-85]; [15-75];
- in which:
  - lime: [10-95]; [20-70]; [30-60];
  - source of alumina and/or source of calcium sulfate: [1-90]; [5-30]; [7-15];
- -A2- water retention agent: [0.1-5]; [0.5-3]; [0.8-2];
- -A3- surfactant: [0.01-1]; [0.05-0.5];
- -A4- secondary binder [0-85]; [5-50]; [7-15];
- -A5- inorganic lubricating filler having a particle size d90 that is less than 100 μm: [0-40]; [0-30]; [0-20];
- -A6- inorganic spacer filler having a particle size d90 that is greater than or equal to 100 μm: [0-40]; [0-35]; [0-30];
- -A7- water repellent admixture: [0-1.5]; [0-1]; [0-0.5];
- -A8- set retardant admixture: [0-3]; [0-2]; [0-1];
- -A9- set accelerator admixture: [0-3]; [0-2]; [0-1];
- -A10- thickening admixture: [0-2]; [0.1-1]; [0.2-0.8].

-B- Bio-Based Filler

This plant-based bio-based filler, typical of the compositions according to the invention, is based on sunflower stalks and/or corn stalks and/or rape stalks having a Bulk Density (BD) in kg/m$^3$ that is less than 110; preferably between 10 and 80.

More specifically, this filler -B- comprises particles of sunflower stalks and/or corn stalks and/or rape stalks.

According to a preferred characteristic of the invention, the bio-based filler B consists of stalk particles which have a complete pass-through particle size in the largest dimension of said particles (in mm and in increasing order of preference) of: 515; 514; 513; 512; 511.

According to a preferred embodiment of the invention, the percentage of stalk pith in the B bio-based filler is (in % by weight on a dry basis and in increasing order of preference): >15; ≥20; ≥30; ≥40; ≥50≥60; ≥70; ≥80; ≥90; ≥95; ≥99.

According to a preferred feature of the invention, the stalk particles of the filler (B) mainly consist of pith particles. More preferably, the percentage $P^{pith}$ by weight on a dry basis of pith particles relative to the total mass of the stalk particles is defined as follows, in increasing order of preference: $P^{pith}$>15; 2 20; 30; 2 40; >50.

These particles are for example in the form of fibers, fibrils, dust, powder, chips, hairs, and/or shives.

The sunflower, corn, or rape stalks each comprise a skin surrounding the pith.

This pith is a plant-based raw material which has proved suitable for the composition according to the invention. This pith is obtained by separating the skin of the corn stalk, sunflower, or rape, after crushing these stalks. These plants are grown for their nutritional qualities (oil, grains, etc.). Once the flower heads or ears have been harvested, the stalks or the straw are left on the field and are not fully exploited. At best they are buried in the soil where they contribute a small amount of nutrients. It has been observed in particular that sunflower, corn, or rape stalks, consisting of skin (outer part) and pith (inner part), have a low nutritional value and that what they do have is mainly due to protein substances present in the skin. Unlike the skin, the pith of sunflowers, corn, or rape is characterized by a highly alveolar structure which gives it a very low density (30-35 kg/m$^3$). For the invention, in collaboration with certain agricultural cooperatives, corn or rape stalks were harvested and crushed by silaging directly on the field. Then, through a separation process using a gravity table, it was possible to separate the skin from the pith. The pith was then ground up once again by passage through a knife mill to obtain the desired particle size (about 5 to 15 mm). As shown in Example 2 below, an insulating mortar based on filler -B- from sunflower pith can be pumped using a rendering machine type of screw pump, having a typical 2L6 or 2R6 jacket. The same type of process can be applied to corn or rape stalks (rape straw).

The filler (B) particles may have various shapes, acicular or non-acicular, preferably non-acicular.

Intermediate Products

Another object of the invention concerns a binder -A- as a novel product for partially bio-based construction materials, this binder being intended in particular for the composition according to the invention.

Preferably, this binder A according to the invention comprises—as % weight/weight on a dry basis and in increasing order of preference:
-A1- primary binder: [5-95]; [10-85]; [15-75];
in which:
lime: [10-95]; [20-70]; [30-60];
source of alumina and/or source of calcium sulfate: [1-90]; [5-30]; [7-15];
-A2- water retention agent: [0.1-5]; [0.5-3]; [0.8-2];
-A3- surfactant: [0.01-1]; [0.05-0.5];
-A4- secondary binder [0-85]; [5-50]; [7-15];
-A5- inorganic lubricating filler having a particle size d90 that is less than 100 μm: [0-40]; [0-30]; [0-20];
-A6- inorganic spacer filler having a particle size d90 that is greater than or equal to 100 μm: [0-40]; [0-35]; [0-30];
-A7- water repellent admixture: [0-1.5]; [0-1]; [0-0.5];
-A8- set retardant admixture: [0-3]; [0-2]; [0-1];
A9- set accelerator admixture: [0-3]; [0-2]; [0-1];
-A10- thickening admixture: [0-2]; [0.1-1]; [0.2-0.8].

The invention also concerns a kit as a novel product, comprising the above binder -A- and the plant-based filler -B- as defined above.

Wet Composition

According to another of its aspects, the invention relates to a wet construction composition formed by a mixture of the dry composition according to the invention, mixed with a liquid, preferably water.

According to a noteworthy feature of the invention, this wet composition is pumpable in a screw pump with an air gap (E) between rotor (20) and stator (18) of between 4 and 30 mm. The references refer to the appended FIG. 1.

Such an air gap preferably corresponds to a commercial jacket of type 2L6 or 2R6.

Method for Preparing this Wet Composition

The present invention also relates to a method for preparing the wet composition as defined above. This method consists of mixing a liquid, preferably water, with the dry construction composition as defined above, advantageously in a mass ratio [water/binder -A-] that is greater than or equal to 0.8, preferably greater than 1, preferably greater than 1.5.

This mixing can be done by any suitable conventional device known to those skilled in the art.

It may be a planetary or fixed-axis (vertical or horizontal) mixer, or a concrete mixer. The mixing device may or may not be installed directly on the machine comprising the screw pump and enabling spray application or casting of the wet composition.

Machine for Pumping and Spraying Said Wet Construction Composition

The machines considered here are "screw pumps", preferably:
of the type used to spray wall coatings (such as Lancy PHB-R, Bunker S8 Smart, Urban Volta, Spritz S28R, Spritz S38, Turbosol UNI30, Putzmeister SP11, SS5, or SP5);
or concrete pumps (such as Bunker B100).

Patent Application WO97/45461A1 describes an example of this type of "screw pump". That pump generally comprises a suction chamber and a discharge port provided at respective ends of a stator, inside of which is arranged a helical rotor with a single helix intended to cooperate with a double-helix stator. The stator is preferably composed of an elastomeric material, while the rotor 18 is advantageously of metal. The latter is rotatable about its axis by means of appropriate drive and transmission means. U.S. Pat. Nos. 2,512,764 and 2,612,845 are some examples of sources of information on the detailed structure of these screw pumps.

Figure 1:
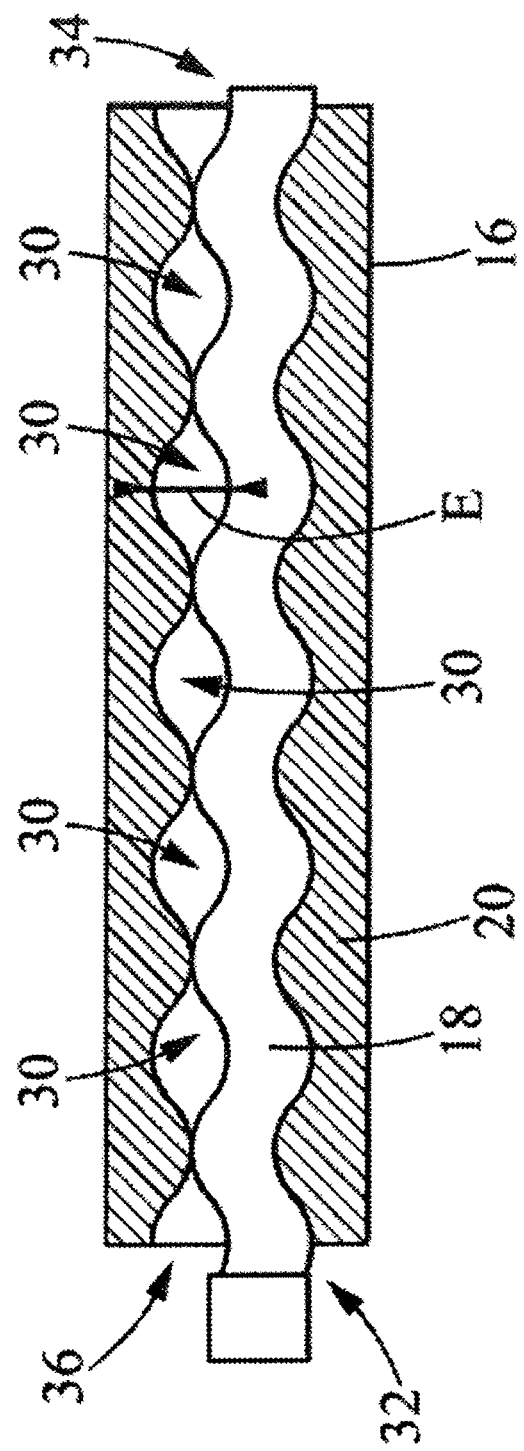
FIG. 1 shows a simplified diagram of a screw pump.

The appended FIG. 1 shows a simplified diagram of a screw pump comprising a stator tube 16, a stator 20 traversed by a bore 36 within which a rotor 18 rotates. This stator tube 16/stator 20 has a suction end 32 and a discharge end or discharge port 34. When the rotor 18 is rotating inside the bore 36 of the stator 20, cavities 30 are formed between the rotor 18 and the stator 20. These cavities 30 progress from the suction end 32 to the discharge end or port 34. The cavities 30 have a length defined by the pitch of the helix of the rotor 18 and a maximum height or air gap E shown in FIG. 1. This gap E may for example vary between 1 and 50 mm, preferably 4 to 30 mm.

This assembly of stator tube 16/stator 20/rotor 18 is also referred to as a jacket. The jackets/stators commonly mounted on machines used to spray wall coatings are, for example, type "2L6" or 2R6 or type 2R8 (compatible with the Bunker B100 concrete pump).

Method for Applying Said Wet Composition

The present invention also relates to a method for applying the wet composition as defined above (steps 1°, 2°, and 3° {3.1°; 3.2° or 3.3°}):

Preferably, the wet mortar is applied by spraying, using a spray machine called a "rendering machine" comprising a screw pump.

- For a bio-based filler -B- less than 10 mm in size, the spray machine is advantageously a Putzmeister S5, SP5, SP11, Bunker S8, S28R, S38, Lancy PH9B or PH9B-R, or Turbosol Talent DMR, this machine comprising a screw pump equipped with a 2L6 or 2R6 rotor-stator.
- For a bio-based filler -B- greater than or equal to 10 mm and less than 30 mm in size, the spray machine is advantageously a Bunker B100 and CL 18, Putzmeister SP20, Lancy TB20, or Turbosol Silant 300 CL, this machine comprising a screw pump equipped with a type 2L8 or 2R8 rotor-stator.

1° Preparing a Mixture of Liquid—Preferably Water—and the Dry Composition According to the Invention.

The mortar is mixed in the tank of the machine when said machine has one or in a concrete mixer, according to the following description, preferably:

- -a- mixing 100 L of the bio-based filler -B- with mixing water (the total amount of water decreased by about 2 L) for at least 1 min.
- -b- adding all the binder and mixing for about 5 minutes, adjusting the viscosity by adding water if needed. The viscosity of the obtained mortar must allow good flow in the pumping tank (mortar settling horizontally due to its own weight) while maintaining a threshold enabling the mortar to hold at 5 cm.
- -c- transferring the mix into the tank of the screw pump.

2° Pumping the Mixture Prepared in Step 1, Using a Screw Pump

The spray machines known as "rendering machines" generally comprise a hose upstream of the screw pump for pumping the wet mortar formulation, and downstream of it a spray hose equipped with a spray gun on the free end.

Preferably, before starting up the screw pump, a slurry of binder (for example between 1 to 50 kg, about 10 kg) is preferably introduced into the pumping hose in order to "grease" and "lubricate" said hose.

The screw pump settings are advantageously adjusted beforehand using water, for a pressure for example of 1 to 20 bar: about 5 bar for a 2L6 jacket; or 1 to 20 bar: about 3 bar for a 2L8 jacket.

For a 2L6 or 2R6 jacket, the spray hose comprises for example a first portion having an internal cross-section for example of 15 to 50 mm: 35 mm; for a length for example of 5 to 30 m: about 13 m; and a second portion having an internal cross-section for example of 15 to 50 mm: 25 mm; and a length for example of 1 to 10 m: Sm.

For a 2L8 or 2R8 jacket, the spray hose has for example an internal cross-section of 50 mm for a length of 10 m.

3° Spraying the Mixture Prepared in Step 1

For spraying, the spray gun is advantageously supplied with compressed air.

Hardened Mortars

The invention relates to hardened mortars obtained from the aforementioned wet composition. These hardened mortars advantageously have thermal conductivity lambda values X that are less than or equal to—in W/mK and by increasing order of preference—0.15; 0.12; 0.1; 0.08; 0.07.

ETI/ITI Systems

The invention relates to an Exterior Thermal Insulation—ETI—or Interior Thermal Insulation—ITI—system comprising hardened mortar as referred to above and applied in layer(s) to a total thickness of between 2 and 30 cm, preferably between 5 and 15 cm, and covered by a waterproofing coating at least 10 mm thick. This system is characterized in that the hardened mortar comprises lime and at least one source of alumina, and in that it satisfies the test according to the EOTA ETAG 004 standard in the context of ETI.

The waterproofing coating is advantageously in accordance with NF EN 998-1. It is preferably chosen from the OC1s. It is for example applied after a minimum of 24 hours following the application of the last pass of bio-based insulating mortar.

Building Structures or Civil Engineering Works

The invention also relates to building structures obtained after spray application or molding or on-site assembly, of objects prefabricated using the composition according to the invention.

Other advantageous features and details of the invention will be apparent from the following description of some exemplary embodiments of the invention.

EXAMPLES

Pumpability Test T1:

Test T1 consists of testing the passage of a wet formulation obtained from the mortar composition to be tested, through a rendering spray machine equipped with a screw pump.

For a bio-based filler less than or equal to 10 mm in size, a screw pump equipped with a 2L6 rotor-stator mounted on a SP1 Putzmeister machine is used.

For a bio-based filler greater than 10 mm and less than 30 mm in size, a screw pump equipped with a 2L8 rotor-stator mounted on a Bunker B 100 machine is used, with an integrated mixer.

The mortar is mixed in the tank of the machine, as follows:

1. Mixing 100 L of bio-based filler with almost all the mixing water for 1 min, keeping in mind that the water to A is between 0.8 and 5.
2. Adding all of binder -A- then mixing for 5 min, adjusting the viscosity by adding a small amount of water if needed, so that the viscosity of the obtained mortar allows it to flow in the pumping tank of the screw pump in under a minute.
3. Transferring the mix into the tank of the screw pump.
4. Pre-adjusting the screw pump by tightening, while sending water through the jacket, to obtain at the jacket outlet a pressure of about 5 bar for a 2L6 jacket or about 3 bar for a 2L8 jacket.
5. Pumping the mixture present in the tank of the screw pump.

The composition to be tested is considered to be pumpable if there is no blockage of the screw pump, in other words the observation that no wet mortar formulation is expelled at the screw pump outlet or the observation of phase separation between the bio-based filler -B- and the binder phase at the screw pump outlet. Accordingly, as defined herein, "pumpable" means that under the test T1 conditions described above, no wet mortar formulation is expelled at the screw pump outlet, and no phase separation is observed between the bio-based filler -B- and the hinder phase at the screw pump outlet, "No formulation is expelled" is understood to mean the discharge of wet formulation during at least 30 minutes, in an amount of less than one liter.

"Phase separation" is understood to mean a separation of the interstitial liquid and the granular phase of the mortar. Plugging or jamming of the pump is a consequence of the separation of the liquid phase and the granular matrix as the product travels within a confined space. This phase separation will cause the appearance of direct contact between aggregates (particularly the particles of filler -B-), and therefore blockage.

This test is carried out at ambient temperature and atmosphere.

Measurement Method M1 Providing the "Hardening" Time of a Bio-Based Mortar and Enabling Estimating the Recoverability Period The recoverability period is related to the hardening of the bio-based mortar. The hardening time corresponds to the acquisition of a compressive strength (NF EN 1015-11) greater than or equal to 0.1 MPa, which allows unmolding a 4×4×16 cm mockup. As defined herein, "setting time" refers to the hardening time of the wet mortar formulation as measured according to the method M1 described below, Protocol:
1. The product is mixed using a vertical axis planetary mixer specified by standard NF EN 196-1.
   a) The plant-based filler B is mixed with almost all the mixing water for 1 min at a speed of 120 rpm, keeping in mind that the water to A is between 0.8 and 5.
   b) The binder is added then mixed for 300 sec at a speed of 120 rpm. The viscosity is adjusted by adding a small amount of water if needed, so that the mixed mortar can flow into the mold of step 2 in less than 30 seconds.
2. After mixing, the mortar is molded in metal molds 4×4×16 cm in size.
3. The test pieces are then stored at 20° C. and 50% RH.
4. The "hardening" time corresponds to the moment when the cohesion of the test piece allows it to be unmolded without damage.

"Damage" is understood to mean cracking and/or partial or complete breakage of the test piece.

As defined herein, "water retention" refers to the ability of a material to retain water as measured using an adaptation of the so-called filter method according to the method M2 described below.

Materials:
Metal mold.
   Internal dimensions:
   Top diameter: 100+5 mm.
   Bottom diameter: 80+/−5 mm.
   Height: 25+1 mm.
   External dimensions:
   Diameter: 120+/−5 mm.
   Height: 30+1 mm.
Spatula
Earthenware tile (size: about 120 mm×5 mm)
Precision balance 0.01 g
100 mm diameter filter paper (Schleicher or Lab-filter 0965 NW 25 L): separation filter
100 mm diameter filter paper (Schleicher 2294 or Lab-filter S-Type 600)

Protocol:
1. Prepare the sample according to the mixing procedure described for test T2.
2. Weigh the dry and empty mold➔ $m_A$
3. Weigh the Schleicher 2294 or Lab-filter S-Type 600 filter paper➔ $m_B$
4. Fill the mold with the bio-based mortar using a spatula, slightly overfilling to ensure contact between filter and paste.
5. Weigh the filled mold➔ $m_C$
6. Cover the paste with the separation filter paper (Schleicher or Lab-filter 0965 NW 25 L) and then place the 2294 or S-600 filter on the whole
7. Place the earthenware tile on the whole and turn it all over, start the stopwatch; the test time is 15 minutes,
8. After 15 minutes, collect the 2294 or S-600 filter paper and weigh it➔ $m_D$ Expression of Results:
Calculation 1: mass of water contained in the product $M\text{water}=((m_C-m_A)*Tg\%)/(100+Tg\%)$ Calculation 2: water loss from the product $\Delta\text{water}=(m_D-m_B)$ Calculation 3: Water retention as a %

$R\%=((M\text{water}-\Delta\text{water})/M\text{water})*100$

EN 1015-8: Methods of Test for Mortar Masonry—Part 8: Determination of Water Retentivity of Fresh Mortar. (September 1999)

Raw Materials
Binder A
A1:
HYDRAULIC LIME HL 3.5 LAFARGE.
SULFOALIMINATE CEMENT, LTECH ALICEM, ITALCEMENTI;
A2:
CULMINAL C8367, WATER RETENTION AGENT, HYDROXYETHYL METHYLCELLULOSE, VISCOSITY 32000-40000 MPA·S, ASHLAND AQUALON;
A3:
NANSA LSS 495/H, SURFACTANT, SODIUM ALPHA OLEFIN SULFONATE, HIUNTSMAN;
A5:
SILICA FUME, RW SILICIUM GMBH;
A6:
PORAVER, EXPANDED GLASS AGGREGATE, PARTICLE SIZE IN MM 01-03, PORAVER GMBH;
SILICON SAND, DU 0.1/0.4, SIBELCO FRANCE
A7:
OPTIGEL WM, ORGANICALLY MODIFIED BENTONITE, ROCKWOOD ADDITIVES.

Filler -B-:
Filler formed by 95% plant pith obtained by grinding sunflower stalks then sorted using gravity tables (sieve) and vibrating screen. The size of the particles is between 2 mm and 15 mm.

The photographs in the attached FIG. 2 show a sunflower stalk before grinding (left photo), and after grinding and separation: sunflower skin (center photo) and pith (right photo). Sunflower pith particles after grinding and separation are also shown in the photograph on the left in the attached FIG. 3.

Comparative Example 1: Formula According to the Prior Art (Example: Tradical® PF70)

Tradical PF70 from Balthazard & Cotte Batiment (Lhoist group) mainly comprises about 75% hydraulic lime, 15% hydraulic binder, and 10% pozzolanics.

The conclusions of the assay according to test T1 are:
Machine blockage due to phase separation. Retention according to T3 is less than 90%;
Curing time greater than 48 h, measured according to T2.

| | COMPARATIVE EXAMPLE 1 |
|---|---|
| Spray machine | BUNKER B100 |
| Associated jacket | 2L8 |
| Formula description | Prior art TRADICAL PF70 |
| Binding matrix [kg] | 33 |
| Filler B labeled "hemp straw for construction" KANABAT: | |
| Volume [L] | 100 |
| Mass [kg] | 10 |
| Ratio volume/weight Filler B/Binder A [L/kg] | 3.03 |
| Ratio weight/weight Filler B/Binder A [kg/kg] | 0.3 |
| Water [L] | 42 |
| Mass ratio Water/Binder A | 1.27 |
| Composition of binding matrix | |
| Binder A    TRADICAL PF70 (BCB) | 100% |
| Application comments | |
| Passage through machine/pumping test T1 | Pump blocked/ phase separation |
| Properties in hardened state | |
| Density [kg/m$^3$] | — |
| Thermal conductivity [W/mK] | — |

Example 2

This example 2 of insulating mortar with very low lambda values <0.1 W/mK, uses a bio-based filler B consisting of round sunflower pith particles. This wet mortar can be sprayed with an eccentric screw pump as is conventionally used to spray rendering plaster (jacket type 2L6 or 2R6).

| Formulas | | |
|---|---|---|
| Spray machine | | PUTZMEISTER SP11 |
| Associated jacket | | 2L6 |
| Binding matrix [kg] | | 6.75 |
| Filler B formed of sunflower pith particles: | | |
| volume [L] | | 45 |
| Mass [kg] | | 1.5 |
| Ratio volume/weight Filler B/Binder A [L/kg] | | 6.66 |
| Ratio weight/weight Filler B/Binder A [kg/kg] | | 0.22 |
| Water [L] | | 22 |
| Mass ratio of Water/Binder A | | 3.25 |
| Composition of binding matrix A | | |
| A.1 Inorganic primary binder | Hydraulic Lime HL 3.5 (Lafarge) | 58.78% |
| | Sulfoaluminate cement ITech ALICEM (Italcementi) | 10% |
| A.2 Water retention agent | MHEC CULMINAL C8367 (Ashland) | 1.13% |
| A.3 Surfactant | NANSA LSS 495/H (Huntsman) | 0.09% |
| A6. Inorganic spacer filler | Silicon sand DU 01-04 | 20% |
| A5. Inorganic lubricating filler | SILICA FUME | 10% |

| Formulas | |
|---|---|
| Application comments | Passes through machine correctly |
| Passage through machine/pumping T1 | |
| Properties in hardened state | |
| Density [kg/m$^3$] | 232 |
| Thermal conductivity [W/mK]: hot plate measurement | 0.06 |

The invention claimed is:

1. A dry mortar composition comprising:
a binder component A comprising, as % weight/weight of the binder component A on a dry basis:
  a primary binder in an amount in the range of from 5% to 95%, the primary binder comprising:
    lime in an amount in the range of from 10% to 95%; and
    a source of alumina and/or a source of calcium sulfate, in an amount in the range of from 1% to 90%;
  a water retention agent in an amount in the range of from 0.1% to 5%;
  a surfactant in an amount in the range of from 0.01% to 1%;
  a secondary binder in an amount in the range of from 0% to 85%;
  an inorganic lubricating filler in an amount in the range of from 0% to 40%, the inorganic lubricating filler having a particle size d90 that is less than 100 μm;
  an inorganic spacer filler in an amount in the range of from 0% to 40%, the inorganic spacer filler having a particle size d90 that is greater than or equal to 100 μm;
  a water repellent admixture in an amount in the range of from 0% to 1.5%;
  a set retardant admixture in an amount in the range of from 0% to 3%;
  a set accelerator admixture in an amount in the range of from 0% to 3%; and
  a thickening admixture in an amount in the range of from 0% to 2%; and
a bio-based filler B comprising sunflower and/or corn and/or rape stalk particles, the bio-based filler having a bulk density (BD) that is less than 110 kg/m$^3$, wherein:
a ratio B/A of the volume of dry bio-based filler B in liters to the mass of dry binder component A in kg is in the range of from 2 L/kg to 9 L/kg;
a mixture of the composition and water, in which a mass ratio (Water/A) of the water to the binder component A is in the range of from 0.8 to 5, is pumpable in a screw pump.

2. The composition of claim 1, wherein the bio-based filler B has a bulk density (BD) in the range of from 10 kg/m$^3$ to 80 kg/m$^3$.

3. The composition of claim 1, wherein the ratio B/A is in the range of from 2.5 L/kg to 8 L/kg.

4. The composition of claim 1, wherein the ratio B/A is in the range of from 4 L/kg to 7.9 L/kg.

5. The composition of claim 1, wherein the ratio B/A is in the range of from 4.6 L/kg to 7.5 L/kg.

6. The composition of claim 1, wherein the binder component A comprises, as % weight/weight of the binder component A on a dry basis:

the primary binder in an amount in the range of from 10% to 85%, the primary binder comprising:
  the lime in an amount in the range of from 20% to 70%; and
  the source of alumina and/or the source of calcium sulfate, in an amount in the range of from 5% to 30%;
the water retention agent in an amount in the range of from 0.5% to 3%;
the surfactant in an amount in the range of from 0.05% to 0.5%;
the secondary binder in an amount in the range of from 5% to 50%;
the inorganic lubricating filler in an amount in the range of from 0% to 30%;
the inorganic spacer filler in an amount in the range of from 0% to 35%;
the water repellent admixture in an amount in the range of from 0% to 1%;
the set retardant admixture in an amount in the range of from 0% to 2%;
the set accelerator admixture in an amount in the range of from 0% to 2%; and
the thickening admixture in an amount in the range of from 0.1% to 1%.

7. The composition of claim 1, wherein the binder component A comprises, as % weight/weight of the binder component A on a dry basis:
the primary binder in an amount in the range of from 15% to 75%, the primary binder comprising:
  the lime in an amount in the range of from 30% to 60%; and
  the source of alumina and/or the source of calcium sulfate, in an amount in the range of from 7% to 15%;
the water retention agent in an amount in the range of from 0.8% to 2%;
the surfactant in an amount in the range of from 0.05% to 0.5%;
the secondary binder in an amount in the range of from 7% to 15%;
the inorganic lubricating filler in an amount in the range of from 0% to 20%;
the inorganic spacer filler in an amount in the range of from 0% to 30%;
the water repellent admixture in an amount in the range of from 0% to 0.5%;
the set retardant admixture in an amount in the range of from 0% to 1%;
the set accelerator admixture in an amount in the range of from 0% to 1%; and
the thickening admixture in an amount in the range of from 0.2% to 0.8%.

8. The composition of claim 1, wherein the mixture has a setting time in the range of from 1 hour to 24 hours.

9. The composition of claim 1, wherein the primary binder comprises the source of alumina.

10. The composition of claim 1, wherein the water retention agent has a water retention greater than or equal to 50%.

11. The composition of claim 10, wherein the water retention agent comprises polysaccharides selected from the group consisting of ethers of cellulose or starch and mixtures thereof; methylcelluloses, hydroxypropyl celluloses, hydroxyethyl celluloses, methyl hydroxypropyl celluloses, hydroxyethyl methylcelluloses, and mixtures thereof; modified or unmodified guar ethers and mixtures thereof; and a mixture of these different types.

12. The composition of claim 1, wherein the binder component A comprises the secondary binder, which is different from the primary binder and is selected from the group consisting of Portland cements, quick-setting natural cements, slags, geopolymer cements, natural pozzolans, sodium silicates, potassium silicates, lithium silicates, organic binders, and mixtures thereof.

13. The composition of claim 1, wherein the sunflower and/or corn and/or rape stalk particles comprise sunflower and/or corn and/or rape pith particles.

14. A hardened mortar that is obtained from a wet composition obtained from the composition of claim 1, the hardened mortar having a thermal conductivity $\lambda$, that is less than or equal to 0.15 W/mK.

15. The hardened mortar of claim 14, wherein the thermal conductivity $\lambda$ is less than or equal to 0.12 W/mK.

16. The hardened mortar of claim 14, wherein the thermal conductivity $\lambda$ is less than or equal to 0.1 W/mK.

17. The hardened mortar of claim 14, wherein the thermal conductivity $\lambda$ is less than or equal to 0.08 W/mK.

18. The hardened mortar of claim 14, wherein the thermal conductivity $\lambda$ is less than or equal to 0.07 W/mK.

19. A system of External Thermal Insulation (ETI) or Internal Thermal Insulation (ITI), the system comprising:
the hardened mortar of claim 14 applied in one or more layers to a total thickness in the range of from 2 cm and 30 cm; and
a waterproofing coating covering the one or more layers of the hardened mortar, the waterproofing coating having a thickness of at least 10 mm,
wherein the primary binder comprises the source of alumina.

20. A method for applying an insulating mortar, the method comprising:
preparing a mixture of water and the composition of claim 1, in which a mass ratio (Water/A) of the water to the binder component A is in the range of from 0.8 to 5;
pumping the mixture by means of a screw pump; and
applying the mixture by:
  spraying the mixture on a vertical or inclined substrate, or to fill a wood or metal framework structure on site, or to create prefabricated walls; or
  spraying and spreading the mixture on a horizontal plane to create a screed; or
  pouring the mixture into a formwork in order to create a wall, or between two walls to fill between the walls, or into a mold to create a prefabricated member.

21. A kit comprising:
a binder component A comprising, as % weight/weight of the binder component A on a dry basis:
  a primary binder in an amount in the range of from 5% to 95%, the primary binder comprising:
    lime in an amount in the range of from 10% to 95%; and
    a source of alumina and/or a source of calcium sulfate, in an amount in the range of from 1% to 90%;
  a water retention agent in an amount in the range of from 0.1% to 5%;
  a surfactant in an amount in the range of from 0.01% to 1%;
  a secondary binder in an amount in the range of from 0% to 85%;
  an inorganic lubricating filler in an amount in the range of from 0% to 40%, the inorganic lubricating filler having a particle size d90 that is less than 100 μm;

an inorganic spacer filler in an amount in the range of from 0% to 40%, the inorganic spacer filler having a particle size d90 that is greater than or equal to 100 μm;
a water repellent admixture in an amount in the range of from 0% to 1.5%;
a set retardant admixture in an amount in the range of from 0% to 3%;
a set accelerator admixture in an amount in the range of from 0% to 3%; and
a thickening admixture in an amount in the range of from 0% to 2%; and
a plant-based filler B comprising sunflower and/or corn and/or rape stalk particles, the plant-based filler B having a bulk density (BD) that is less than 110 kg/m³, wherein:
a ratio B/A of the volume of dry plant-based filler B in liters to the mass of dry binder component A in kg is in the range of from 2 L/kg to 9 L/kg;
a mixture of the binder component A, plant-based filler B, and water, in which a mass ratio of the water to the binder component A is in the range of from 0.8 to 5, is pumpable in a screw pump.

* * * * *